United States Patent
Nagai et al.

(10) Patent No.: US 6,754,442 B1
(45) Date of Patent: Jun. 22, 2004

(54) METHOD AND APPARATUS FOR RECORDING/REPRODUCING DIGITAL VIDEO SIGNAL OR AUDIO SIGNAL, AND OPTICAL DISK APPARATUS

(75) Inventors: Yutaka Nagai, Yokohama (JP); Toshifumi Takeuchi, Tokyo (JP); Shigemitsu Higuchi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/517,174

(22) Filed: Mar. 2, 2000

(30) Foreign Application Priority Data

Oct. 1, 1999 (JP) ............................................ 11-281076

(51) Int. Cl.[7] .............................. H04N 5/85; H04N 7/04; H04N 7/52
(52) U.S. Cl. ........................ 386/125; 386/105; 386/106
(58) Field of Search ................................. 386/125, 126, 386/124, 46, 1, 104, 105, 106, 109, 111, 112, 27, 33, 45, 39, 40; H04N 5/85, 7/04, 7/52

(56) References Cited

U.S. PATENT DOCUMENTS 4,542,417 A * 9/1985 Ohta
5,377,051 A * 12/1994 Lane et al.
5,446,598 A * 8/1995 Takayama

FOREIGN PATENT DOCUMENTS

| JP | 362043988 A | * | 2/1987 |
| JP | 401223662 A | * | 9/1989 |
| JP | A-6-290538 | * | 10/1994 |
| JP | A-7-111629 | * | 4/1995 |
| JP | A-11-232844 | * | 8/1999 |

* cited by examiner

Primary Examiner—Robert Chevalier
(74) Attorney, Agent, or Firm—Antonelli, Terry, Stout & Kraus, LLP

(57) ABSTRACT

A digital video or audio signal recording/reproduction method and apparatus and an optical disk apparatus are provided, in which a program is recorded in a recording medium on a disk while at the same time reproducing the video information already recorded. When the recording and reproduction are alternated repetitively, the rotation for recording is controlled in stable fashion. To this end, the rotation of the recording medium is controlled in accordance with the recording control method during the recording, and the rotational speed at the time of switching from the recording mode to the reproduction mode is held during the reproduction period, thereby stably controlling the rotation of the medium for recording.

12 Claims, 12 Drawing Sheets

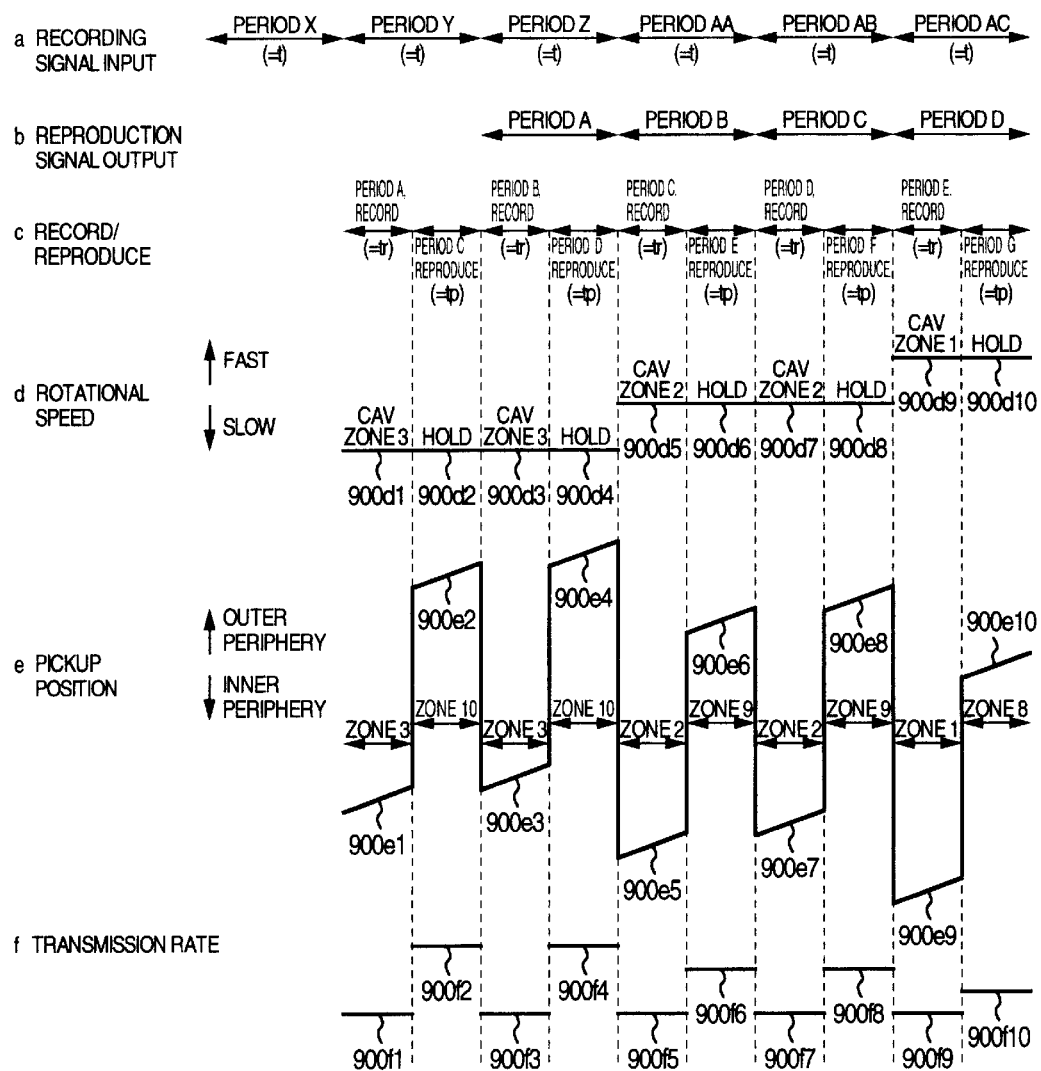

METHOD AND APPARATUS FOR RECORDING/REPRODUCING DIGITAL VIDEO SIGNAL OR AUDIO SIGNAL, AND OPTICAL DISK APPARATUS

BACKGROUND OF THE INVENTION

The present invention relates to a digital recording and reproduction apparatus for video signals and audio signals in the TV broadcasting, or more in particular to a time shift function.

A conventional technique for recording/reproducing the TV broadcast program is a VTR. The tape medium is considered as an inexpensive medium for recording video signals and audio signals. Nevertheless, the tape medium is not suitable for random access for its structure.

For reproducing the program recorded in the VTR, the tape is required to be rewound to the head of the program. Thus, it is difficult to reproduce the video information already recorded, while at the same time recording a program. The program which the user has started to record using a timer or the like cannot be viewed from the head of the program before the program is completely recorded to the last.

With the optical disk, which is superior to the tape in random accessibility, on the other hand, JP-A-6-290538 discloses a method using a CLV (constant linear velocity) scheme most suitable in terms of recording density for recording, while a CAV (constant angular velocity) scheme superior in accessibility is employed for reproduction. In a system for repeating the recording and reproduction alternately, however, the relation of the target rotational speed between the two processes has not been taken into consideration.

JP-A-11-232844 discloses performing recording and reproduction for each track alternately. However, it does not concretely teach any rotational speed control in the recording and reproduction.

Further, JP-A-7-111629 describes a technique for realizing the time shift using a disk-like recording medium. This technique, however, presupposes the use of two pickups and fails to refer to a method of controlling the rotation.

SUMMARY OF THE INVENTION

An object of the present invention is to provide a digital recording/reproduction method and apparatus for video and/or audio signals and an optical disk device therefor in which the time shift is easily realized.

According to one aspect of the present invention, there is provided a digital video/audio signal recording/reproduction apparatus comprising:

means for temporarily storing a digital input signal and a digital output signal;

means for reproducing the input signal from the medium and writing it in the temporary storage means for tp period:

a random-access disk-like recording medium having spiral or concentric recording tracks; and means for reading an input signal from the temporary storage means and recording the input signal in the random-access disk-like recording medium for the period tr (r: real number), where tr is a recording period from the time point with a predetermined period t (t: real number) when the recording is started in the recording medium at a predetermined transmission rate to the time point when the data amount input during the period t is completely recorded, the period t being segmented into the recording time tr (tr: real number) and the reproduction time tp (=t−tr);

wherein the recording means and the reproduction means are operated alternately and intermittently, thereby making substantially simultaneous recording and reproduction possible at different positions. In this way, the user can start the reproduction immediately from the head of a program without waiting for the end of recording the program and the time shift of a broadcasting can be easily realized.

The temporary storage means has a recording data buffer area and a reproduction buffer area. In the case where the recording fails due to a disk defect during the alternate intermittent operation, the write operation is continued without switching to the reproduction mode. As a result, the recording process and the reproduction process may both be delayed and the buffer areas may run short. To meet this situation, a part or the whole of reproduction buffer area is replaced with a recording buffer area to prevent the shortage of the recording buffer area. Even when the disk develops a defect, therefore, the recording operation is given priority and successfully continued although the reproduction may be interrupted.

Also, at the time of recording into a disk, the disk motor is controlled at CLV with a predetermined rate, and at the time of switching to the reproduction mode, the rotational speed is held, so that the reproduction is carried out at variable speed corresponding to the reproduction rate changing during the reproduction period. When the reproduction is switched to the recording mode, therefore, the CLV control is rapidly stabilized since the rotational speed is held at the target. Thus, even with a single optical pickup, the intermittent operation of recording and reproduction can be realized with stable recording operation.

Further, a disk specified to record from the inner toward the outer periphery is segmented into a plurality of concentric zones, and the intermittent recording and reproduction operation described above is carried out from inner toward outer periphery within each zone and from outer toward inner peripheral zone in the area between the zones. As a result, the zone from which the recorded data is reproduced is located on the outer peripheral side than the zone being recorded. Thus, the variable reproduction rate is always higher than the fixed recording transmission rate. When the recording rate is set to at least about twice the transmission rate for inputting the digitized video signal or audio signal, therefore, the recording of an input signal to a medium and the video/audio reproduction from the signal read from an arbitrary point on the medium can be carried out at the same time.

Other objects, features and advantages of the present invention will be apparent from the following description of the embodiments of the invention taken in conjunction with the accompanying drawings.

BRIEF DESCRIPTION OF THE DRAWINGS

FIG. 9 is a timing chart showing the operation of a recording/reproduction method according to a sixth embodiment of this invention.

DETAILED DESCRIPTION OF THE EMBODIMENTS

A first embodiment of the invention will be explained with reference to FIGS. 1 and 2 of the accompanying drawings.

Figure 1:
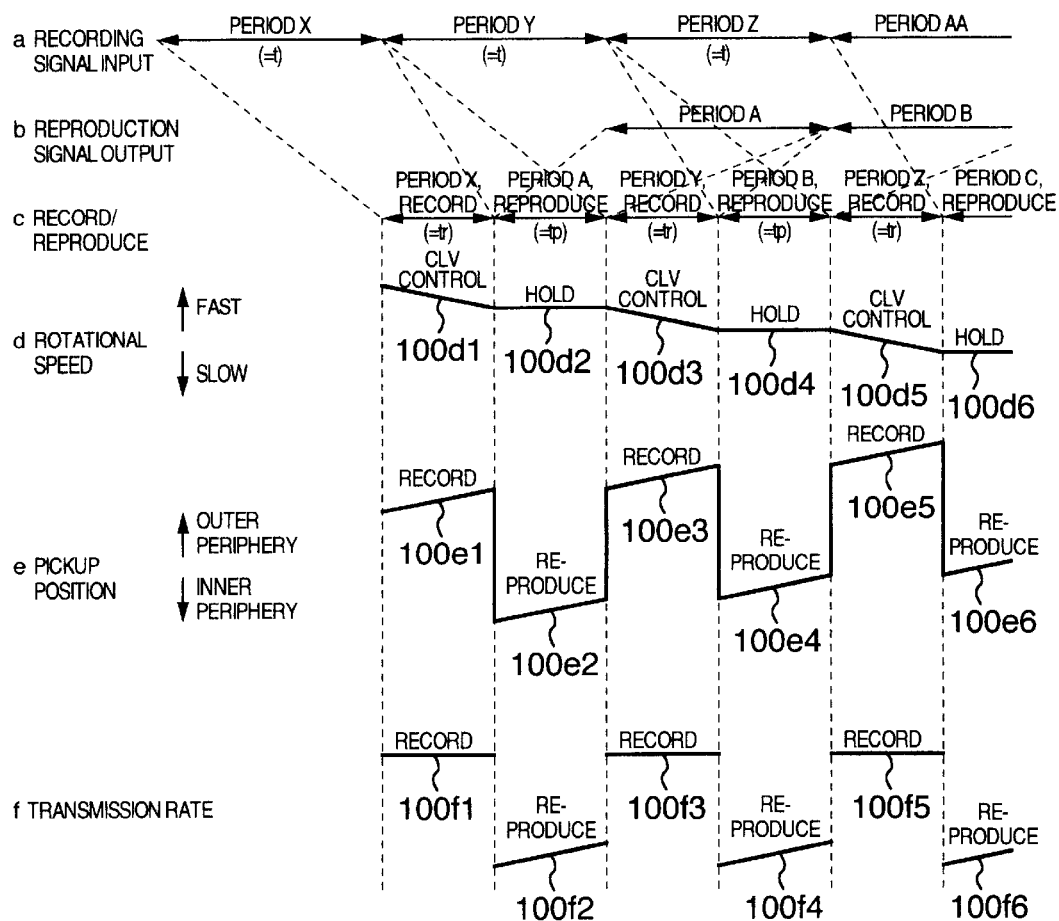
FIG. 1 is a timing chart showing the operation of a recording/reproduction method according to a first embodiment of this invention.
Figure 2:
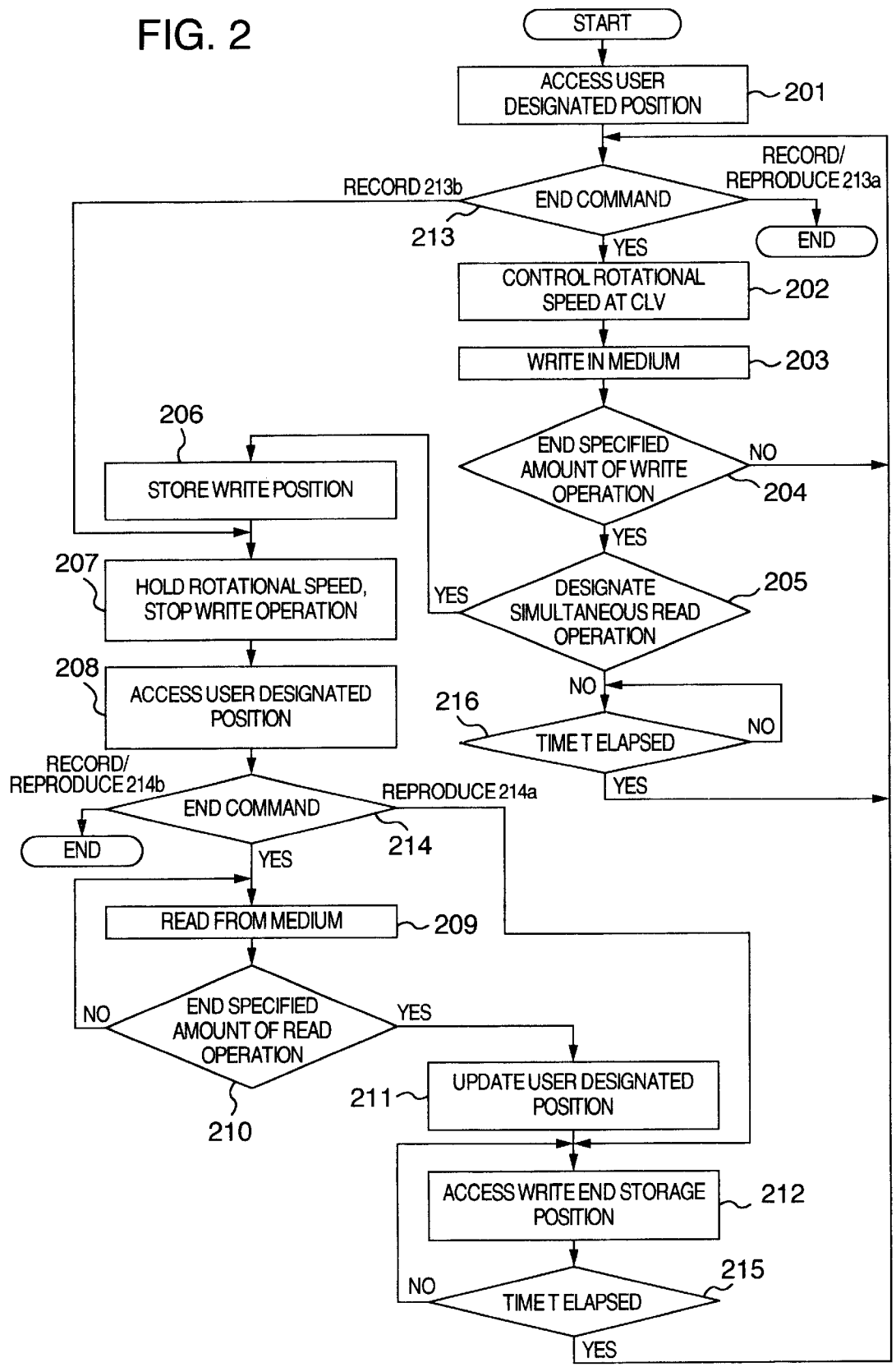
FIG. 2 is a flowchart showing a recording/reproduction method according to the first embodiment of this invention.

FIG. 1 is a time chart showing the operation of a recording/reproduction method according to the invention, and FIG. 2 a flowchart for implementing the same recording/reproduction method.

Now, an explanation will be given of a method for reproducing a recorded program while at the same time recording a program such as a TV program in a disk-like recording medium such as a DVD-RW (digital versatile disk-rewritable), DVD-RAM (digital versatile disk-random access memory) or CD-RW (compact disk-rewritable).

A recording signal input a in FIG. 1 is a digitized video signal and a digitized audio signal for a program such as a TV program input to the apparatus (one of the video signal and the audio signal may be input). A reproduction signal output b is a digitized video signal and a digitized audio signal already recorded. The recording signal input a can be recorded in a medium while at the same time reproducing the image and voice from the reproduction signal output b of the medium, thereby realizing the time shift for a TV program or the like.

The periods A, B, C, ..., X, Y, Z, AA, AB of the recording signal a input to the recording/reproduction apparatus are segmented at predetermined time intervals t (t: real number). The diagram shows the range in which the input signals for the periods X, Y, Z, AA are processed. The reproduction signal output b indicates the video and audio signals output from the apparatus at the same time. The recording/reproduction c indicates the operation of recording into a medium and reproducing from the medium for each period. The recording signal input for the period X is temporally compressed from t to tr (tr: real number) by buffer means such as a RAM and written in the medium in the recording range of the period X. The signal is read from the medium in the reproduction range (tp; t−tr) for the remaining period A of the time t. The signal read in the reproduction range of the period A is temporally expanded by use of buffer means such as a RAM thereby to produce a video signal and a reproduced signal for the time t. The predetermined time t is segmented into a recording period and a reproducing period and the processing with the medium is switched, so that the recording of a part of a program and the reproduction of a different part of the program can be carried out at the same time.

The recording transmission rate fr (fr: real number) satisfies the following relations.

(Total signal amount input from input means during time $t$) $\leq (fr*tr)$ (Signal amount required to be output from output means for video and audio reproduction during time $t$) $\leq (fr*tp)*(r\ in/r\ out)$ Also, the buffer storage capacity Cap (Cap: real number) meets the following equation.

$$Cap \geq [fr*tr]+[fr*tp]*[r\ in/r\ out]$$

where r out is a real number indicating the radius of the outermost periphery of the recording area of the recording medium, and r in a real number indicating the radius of the innermost periphery of the recording area of the recording medium.

Now, the recording/reproduction control operation for this disk will be explained. The rotational speed d is that of the disk. Character c indicates the position of the pickup for writing or reading the signal into or from the disk, and character f indicates the transmission rate of the signal read from or written into the medium. This embodiment is applicable to a disk having spiral tracks from the inner periphery toward the outer periphery and specified to write thereon a signal of a predetermined transmission rate at a predetermined linear rate (CLV control). Therefore, the rotational speed is subjected to CLV control during the periods 100d1, d3, d5 for recording into the disk. Thus, during the periods 100d1, d3, d5, with the approach of the pickup to the outer periphery, the rotational speed is decreased in inverse proportion to the radius. During the reproduction period 100d2, the last rotational speed in the recording period 100d1 is held. For this reason, the rotational speed is coincident with the target rotational speed as of the time when the recording period 100d3 is restarted, and therefore the rotational control operation for the recording period 100d3 is rapidly settled stable. In similar fashion, during the reproduction period 100d4, d6, the rotational speed is held at the figure for the immediately preceding recording operation, and therefore the rotational speed for the recording period is stabilized with rapidity. The pickup moves toward the outer periphery gradually within the range of the recording period of 100e1, then moves toward the inner periphery for accessing the recorded data, and after performing the reproduction for a period of 100e2, moves again toward the outer periphery to record data for a period of 100e3 as a continuation of 100e1. The pickup is moved and the rotational speed is controlled in this way. Therefore, the signal written in the medium at a predetermined transmission rate as shown in 100f1, f3, f5 is used to reproduce the data at CAV from the disk recorded at CLV. During the reproduction, therefore, the transmission rate is changed in proportion to the radial position of the pickup. The signal reproduced from the disk is demodulated in accordance with the transmission rate change and the error thereof corrected or otherwise processed, recorded in the buffer means such as a RAM, read at a predetermined rate, and temporally expanded thereby to produce a reproduced signal output b.

The recording method described with reference to FIG. 1 will be explained in more detail with reference to the flowchart of FIG. 2.

First, the disk is accessed (step 201) at the starting position designated by the user, and in the absence of a user instruction to end the process (213), the rotation is controlled at CLV (202), followed by writing data into the disk (203). Unless the write operation of an input for time t in FIG. 1 into a medium is complete (204), steps (204), (202), (203) are repeated. When the write operation into the medium is complete, on the other hand, it is determined whether the user has requested to record and read at the same time (205). In the absence of such a request for simultaneous read operation, the steps of (202), (203), (204) are repeated. In the presence of a request for simultaneous read operation, on the other hand, the position where the write operation is ended is first stored in a temporary storage unit (206), the rotational speed is held at a value associated with the position where the write operation is ended, and the write operation is stopped (207). Then, in the absence of an instruction to end the process from the user (214), the position on the disk where the intended data is recorded is determined in accordance with the user request for the desired portion of the recorded data from which to start the reproduction of the video and audio signals, and the target position is accessed (208). The data is read from the target position on the medium (209), and unless the write operation of the input associated with time t in FIG. 1 into the medium is complete (210), the step of (209) is repeated. Specifically, while maintaining the rotational speed as of the time point when the write operation is stopped, the data continues to be read from the medium. In the meantime, therefore, the transmission rate of the reproduced signal changes in proportion to the radius r of the pickup position as shown in 100/2, f4, f6 in FIG. 1. Upon complete reading of a specified amount of data from the medium (210), the read position designated by the user is updated to the position where the read operation is stopped (211). This operation permits the continued data to be read at the next read session. After that, until the total time of the process of recording to and reproducing from the medium stored in the step 206 reaches t (215), the access to the position of the medium at which the recording is stopped is repeated (212), and when the time t arrives, the process is returned to the recording steps (202) and (203). In this way, the recording and reproduction operations are performed within the time t. When the user requests to end both the recording and reproduction, the process of step (213) is executed if the recording is going on, and if the request is for ending both the recording and reproduction, on the other hand, the process is ended (213a). If the request is to end only the recording operation, on the other hand, the reproduction process starting from step (207) is executed (213b). In similar fashion, if the request is issued during reproduction, the determination in step (214) is made, while if the request is to end both the recording and reproduction, the process is ended (214a), while if the request is to end only the reproduction, the recording process from step (212) is started (214b).

As described above, according to this embodiment, the operation is segmented into units of time t, so that the recording of the signal input during the time t is alternated with the reproduction of the signal output during the time t for each time t. At the time of recording, on the other hand, the rotational speed is controlled at CLV with a predetermined transmission rate, while during the reproduction, the same rotational speed as at the time when the recording is switched to reproduction is held. Even when the reproduction is switched to recording, therefore, the target rotational speed of CLV is held. Thus the immediate pull-in is possible, and a stable rotation control and highly reliable write operation are realized. Also, the constant linear speed and the constant transmission rate make the invention suitable for realizing a disk of phase change type in particular. Thus, while recording the currently input signal into a medium for a TV program or the like, the portion already recorded can be reproduced at the same time, and therefore the time shift function for the TV programs can be realized.

Now, a second embodiment of the invention will be explained with reference to FIG. 3.

Figure 3:
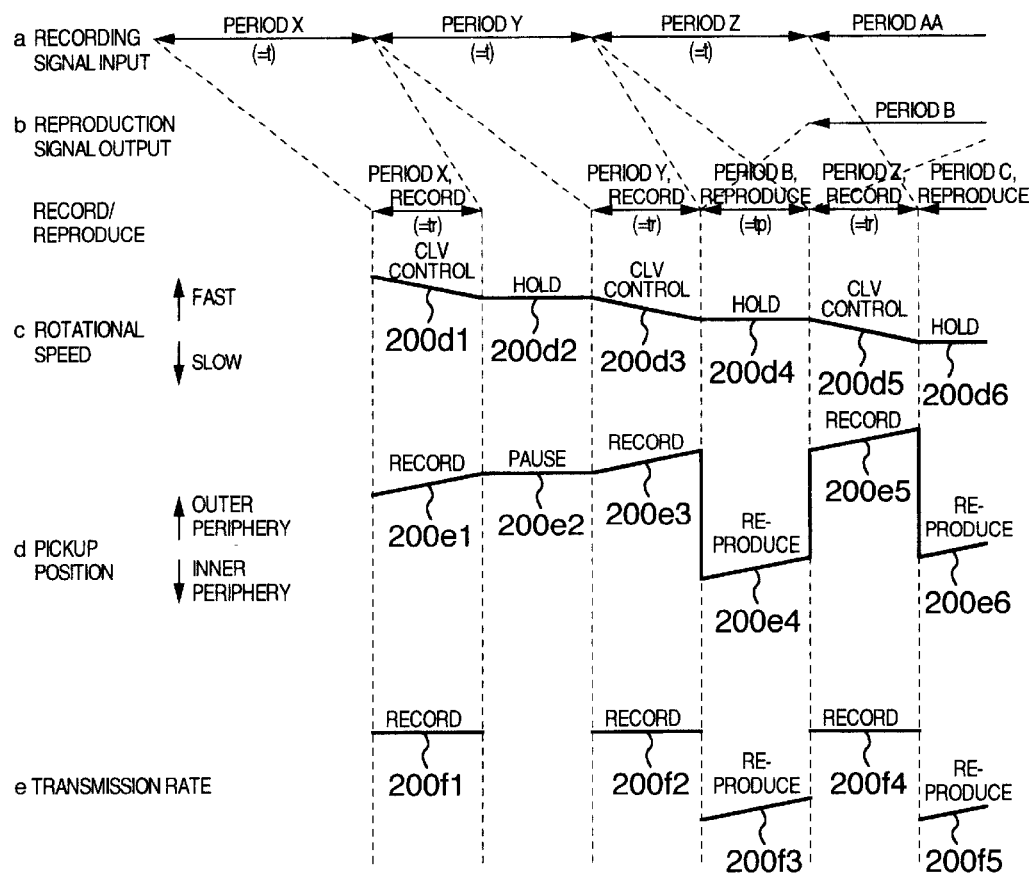
FIG. 3 is a timing chart showing the operation of a recording/reproduction method according to a second embodiment of this invention.

FIG. 3 is a time chart showing the operation of a recording/reproduction method according to this embodiment. Although FIG. 1 shows a method for reproducing a recorded program while recording a program such as a TV program at the same time, the present embodiment represents the case where only the recording operation is performed in an apparatus for realizing the operation of FIG. 1. Only the recording is performed during the period A when the reproduction is performed in FIG. 1. During this period, the rotational speed is held at a similar level to 100d2 (200d2). In order to maintain the current state, the pickup is jumped over tracks and the pause is continued (200e2). The reproduction operation is stopped, and therefore 200/1 corresponding to 100/1 is not shown. This control operation makes it easy to perform the recording operation alone on an apparatus presupposed to perform both the recording and reproduction operation. In similar manner, only the reproduction can be performed on an apparatus which is assumed to perform both the recording and reproduction operations.

The exclusive recording operation is realized in FIG. 2 by the path leading from 214 to 212 to 215 to 213 to 202 to 203 to 204 to 205 to 216 to 213, and the exclusive reproduction operation is realized in FIG. 2 by the path leading from 213 to 207 to 208 to 214 to 209 to 210 to 211 to 212 to 215 to 213.

Now, a third embodiment of the invention will be explained with reference to FIG. 4.

Figure 4:
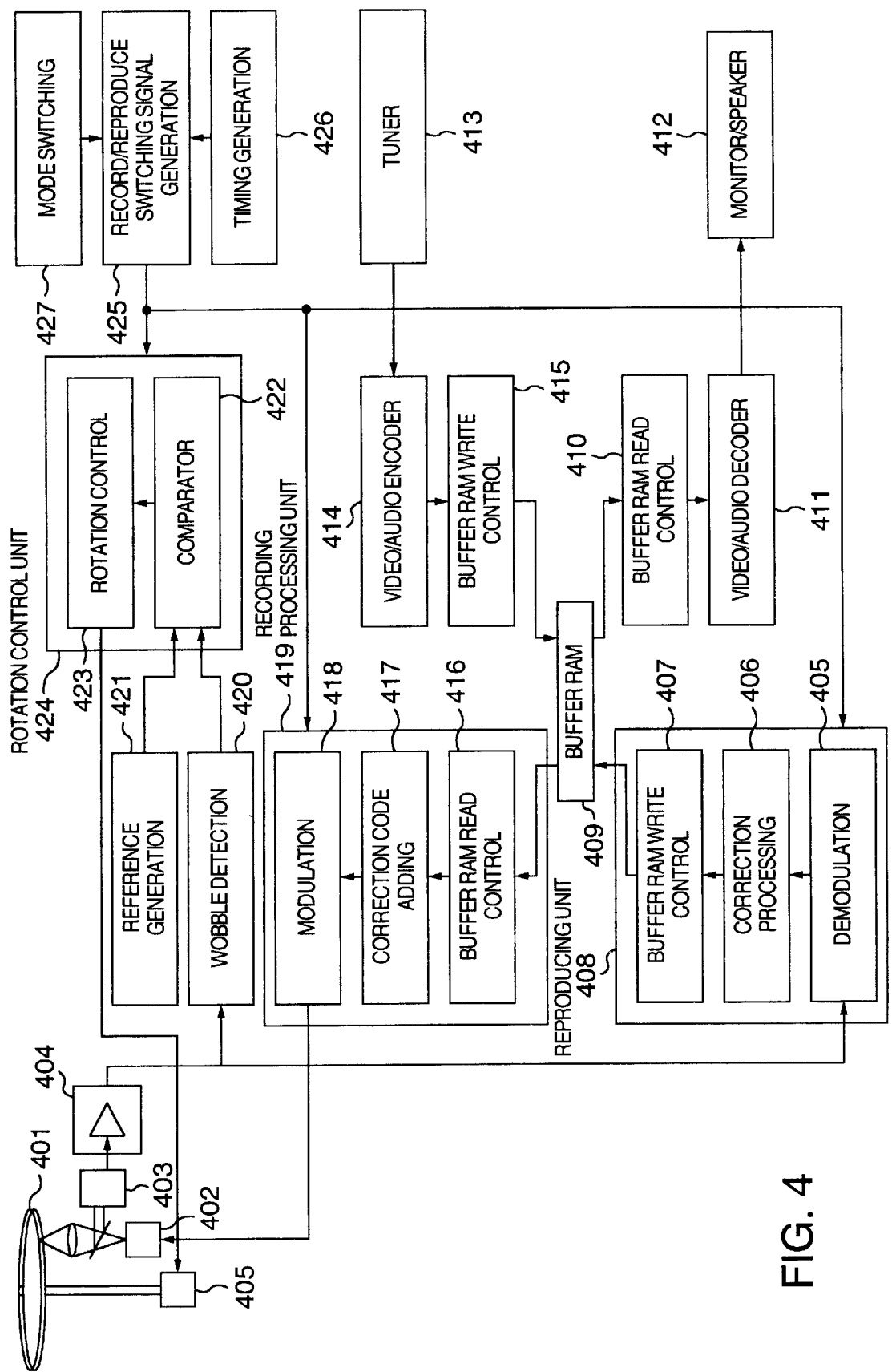
FIG. 4 is a block diagram showing a recording/reproduction apparatus according to a third embodiment of the invention.

FIG. 4 is a block diagram showing a recording/reproduction apparatus according to the invention. In FIG. 4, a reference numeral 413 designates a tuner for receiving a TV broadcast, and numeral 414 designates an encoder for digitizing the video signal and/or the audio signal and compressing it by a method such as MPEG. The encoded digital signal is written into a buffer RAM 409 through a buffer RAM write control circuit 415. The data written in the buffer RAM is sent to a correction code adder circuit 417 through a buffer RAM write control circuit 416, and after an error correction code is added thereto, modulated in a modulation circuit 418, converted into an optical signal by a laser 402 and written in a disk 401. In the process, the disk 401 is rotated by a disk motor 405. Numeral 403 designates an optical pickup for detecting an optical signal from the disk and converting it into an electrical signal, numeral 404 a preamplifier, and numeral 420 a wobble detection circuit for detecting a wobble component from the wobbled recording tracks of the recording medium such as CD-RW or DVD-RAM. The wobble component thus detected constitutes the detection information of the linear speed. Numeral 421 designates a reference generating circuit providing a target linear speed. A comparator circuit 422 calculates to determine which is faster, the reference from the circuit 421 or the detection signal from the circuit 420. A rotation control circuit 423 accelerates the disk motor 401 When the detection signal is slower, and decelerates the disk motor 401 when the reference is slower, thus controlling the linear speed to equal the reference. The reproduction signal from the disk 401, on the other hand, is demodulated in a demodulation circuit 405, and further the error is corrected in a correction processing circuit 406 in accordance with the error correction code added in the circuit 417. After that, the signal is written in the buffer RAM 409 through the buffer RAM write control circuit 407. The signal thus written in the buffer RAM is input to a video/audio decoder 411 through the buffer RAM read circuit 410. In the video/audio decoder 411, the signal is expanded according to the compression rule of the video/audio encoder 414, converted into an analog signal and sent to a monitor/speaker 412. Numeral 427 designates a mode switching circuit for sending each mode of simultaneous record/reproduce, record, reproduce and stop to a record/reproduce switching signal generating circuit 425. A timing generating circuit 426 generates a signal of period t. In the simultaneous record/reproduce mode, the record/reproduce switching signal generating circuit 425 generates a switching signal with the period t divided into a recording period tr and a reproduction period tp. The read rate of the buffer RAM read control circuit 416 is selected in accordance with the transmission rate at which the signal input during the time t from the circuit 415 can be sufficiently recorded for the period tr and the data output from the circuit 410 during the time t for reproducing the video and audio signal can be reproduced for the period tp. Then, during the time tr, a recording processing unit 419 including the circuits 416, 417, 418 is validated, a rotation control system 424 including the circuits 422, 423 is activated and the laser 402 is set in recording mode, whereas during the time tp, the last rotational speed of the time tr is held, a reproduction SYSTEM UNIT 408 including the circuits 405, 406, 407 is activated and the laser 402 is switched to reproduction mode. The signal reproduced from the disk 402 is the signal which is recorded while being controlled at CLV and controlled again at CAV, and therefore the transmission rate of the input signal changes. The reproduction unit 408, however, performs the processing in accordance with the input transmission rate. In this way, while the currently input signal such as a TV program is recorded, the simultaneous reproduction of the recorded portion can be realized at the same time, thereby making it possible to realize the time shift function for a TV program or the like. In spite of the digitization and the compression of the video and audio signals input from the tuner in this embodiment, either of these processes can be performed by the tuner or the broadcast wave may have already been digitally compressed.

Now, a fourth embodiment of the invention will be explained with reference to FIG. 5.

Figure 5:
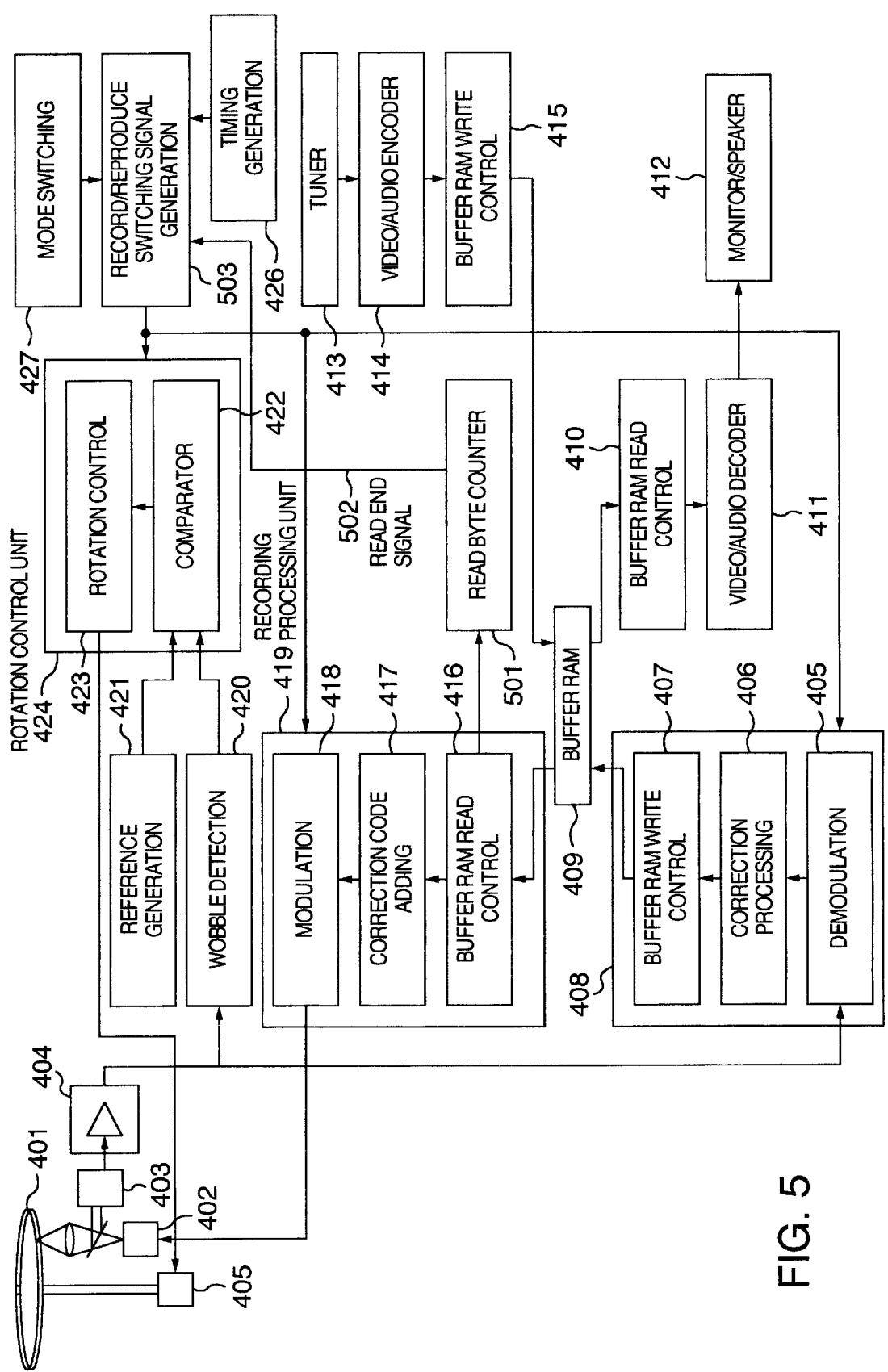
FIG. 5 is a block diagram showing a recording/reproduction apparatus according to a fourth embodiment of the invention.

FIG. 5 is a block diagram showing a recording/reproduction apparatus according to this embodiment. The configuration of FIG. 5 is the same as that of FIG. 4 except for a read byte counter 501, a read end signal 502 and a record/reproduce switching signal generating circuit 503. The read byte counter 501 counts the number of bytes read by the buffer RAM read control circuit 416, starting from the head timing of the period t, and each time the count reaches the number of bytes written into the buffer RAM through the buffer RAM write control circuit 415 during the time t, issues a read end pulse 502. The record/reproduce switching signal generating circuit 503 generates a signal for switching between the recording period tr lasting from the head of the time t to the generation of the read end pulse 502 and the remaining period constituting the reproduction period tp.

Thus, even when the need arises to write the data in other place due to a defect of the disk and the recording fails to end within the calculated period tr, for example, the recording operation can be continued without interruption. When the period tp runs short, on the other hand, the drop off of the reproduction data can be complemented by holding the image of the preceding frame. Also, noises in the audio signal can be eliminated by muting. Further, the reproduction of the audio signal from the medium is given priority, and a portion of the video signal having a larger capacity than the audio signal is omitted. By holding the image of the preceding frame of the video signal, the audio signal can be reproduced without interruption, and it is thereby sufficient to hold the video signal for a short length of time. Even when the period tp runs short, therefore, the reproduction is possible without any imposing inconveniences on the part of the viewer.

According to this embodiment, as described above, the recording operation is not interrupted by a defect, if any, of the medium, and an arbitrary portion of the recorded data can be read during the recording operation.

Figure 6:
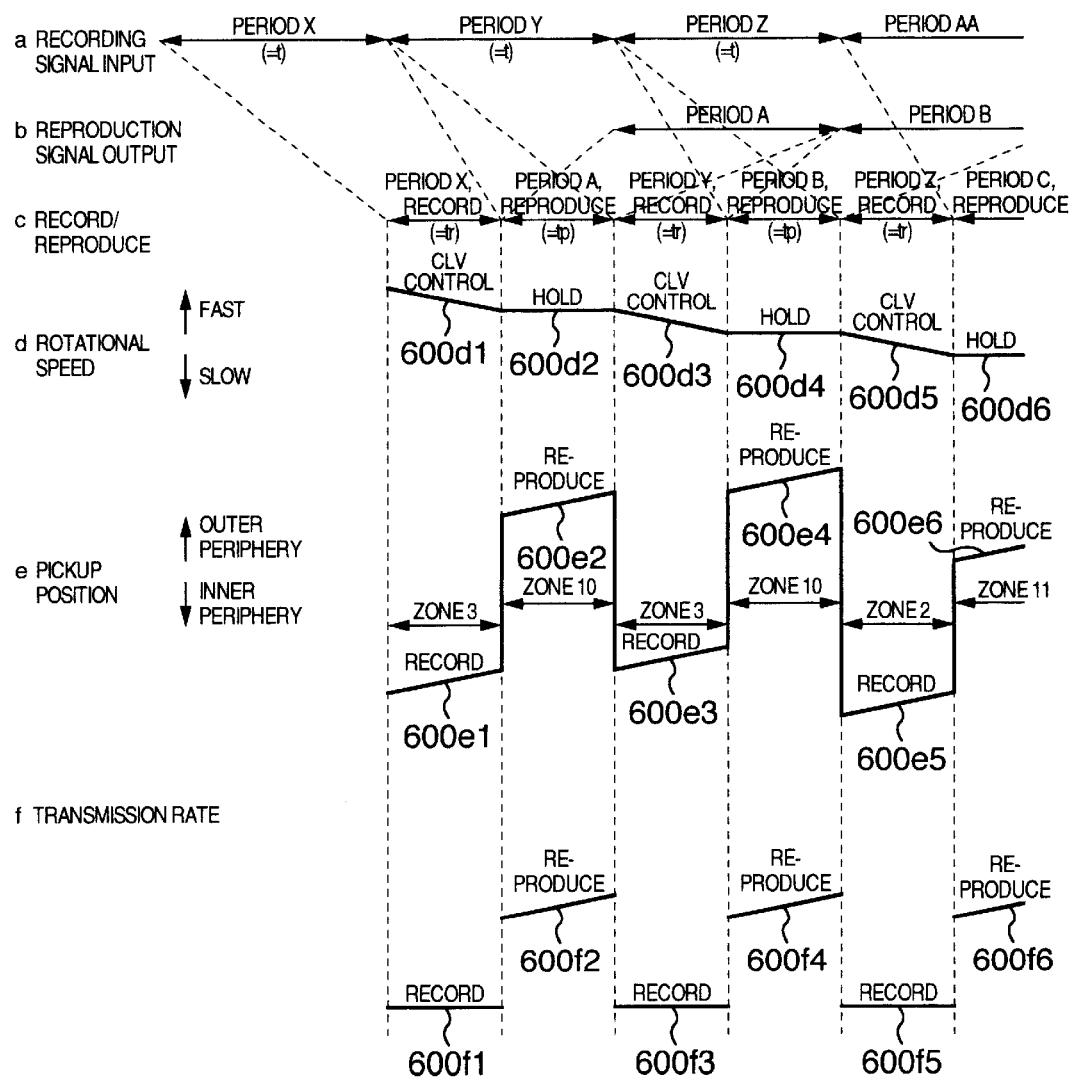
FIG. 6 is a timing chart showing the operation of a recording/reproduction method according to a fifth embodiment of this invention.
Figure 7A:
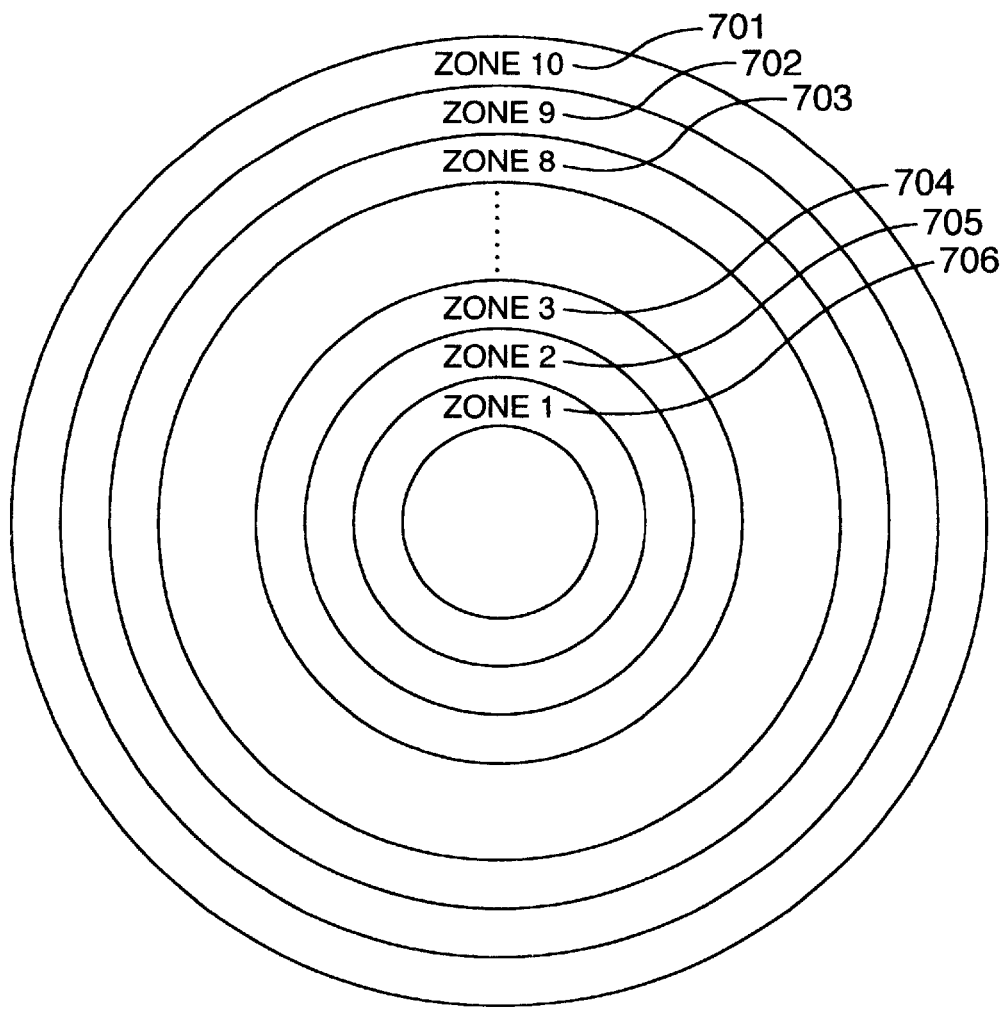
FIGS. 7a and 7b are diagrams showing the shape of the disk used for a recording/reproduction apparatus according to the fifth embodiment of the invention.
Figure 7B:
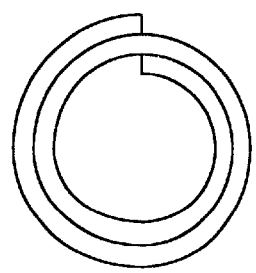
Figure 8:
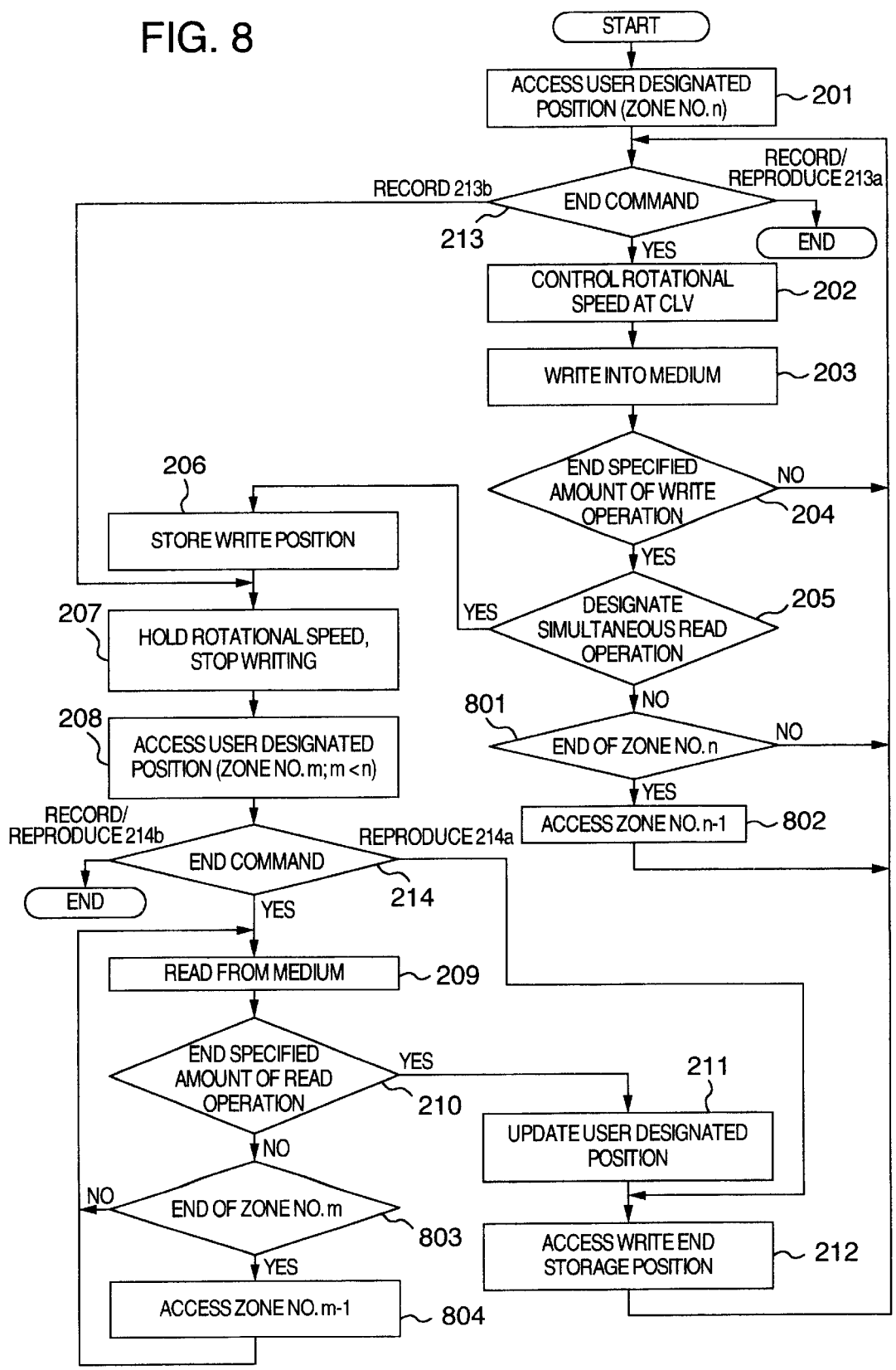
FIG. 8 is a flowchart showing a recording/reproduction method according to the fifth embodiment of the invention.

Now, a fifth embodiment of the invention will be explained with reference to FIGS. 6, 7 and 8. FIG. 6 is a time chart showing the operation of a recording/reproduction method according to this embodiment, FIG. 7 is a diagram showing a disk for performing the recording/reproduction operation according to the embodiment, and FIG. 8 is a flowchart for the recording/reproduction method. According to this embodiment, spiral tracks are formed from the inner periphery toward the outer periphery. Normally, the disk for performing the recording/reproduction operation from the inner periphery toward the outer periphery is segmented into a plurality of zones as shown in FIG. 7a. As shown in FIG. 7b, each zone is composed of a plurality of tracks. In FIG. 7a, the whole, area is segmented into ten zones including zone 1 to zone 10. The operation in FIG. 6 will be explained assuming the disk shown in FIG. 7.

The recording signal a input to the recording/reproduction apparatus, the video and audio reproduction signal b output from the apparatus at the same time, the recording operation into a medium for each period and the reproduction operation c from the medium are the same as the corresponding means in FIG. 1. The input recording signal is temporally compressed and the signal read from the medium is temporally expanded in the same manner as in FIG. 1.

Also, as in FIG. 1, the CLV control is effected during the periods 600d1, d3, d5 and the last rotational speed in the recording period 600d1 is held during the reproduction period 600d2. On the other hand, the pickup position is controlled differently from the operation of FIG. 1. The recording operation is started from the outermost zone 10, and continued toward the inner zones sequentially. FIG. 6 shows the recording operation going on in zones 3 and 2. The pickup, though moved gradually toward the outer periphery within the range of the recording period 500e1, 600e3, moves toward the inner peripheral zone 2 upon complete recording of the zone 3. Thus, an attempt to access the recorded data for reproduction always requires the access to a zone on the outer periphery than the zone involved. In FIG. 6, for example, the recording period 600e2 in zone 10 on the outer periphery is accessed upon complete recording of the recording period 600e1 in zone 3. As shown in 600f1, f3, f5, therefore, the signal written in the medium at a predetermined transmission rate is reproduced with CAV from the outer peripheral side while holding the rotational speed of the disk subjected to CLV control at the time of recording. Thus the signal reproduced from the disk has a transmission rate, though varied depending on the position, always higher than that for recording. In the reproduction system, the processing at high transmission rate is comparatively easy as compared with the recording system, and therefore the recording time tr and the reproduction time tp can be easily set within the range t. Also, in view of the fact that the disk is accessed from outer toward inner periphery only during the movement between zones while the recording/reproduction is carried out sequentially from the inner toward outer periphery along the spiral track within a zone, the apparatus can be easily configured with such a device as the CD-RW for recording or reproducing data from inner toward outer periphery. It is thus easy for the apparatus according to this embodiment to perform the recording/reproduction operation on the existing disk used for recording/reproduction from inner toward outer periphery. Also, when the recording/reproduction apparatus according to this embodiment is configured using the existing disk such as the CD-RW, the data in the disk recorded by the recording/reproduction apparatus according to the embodiment is capable of reproduction since only discontinuous points are accessed for each zone even with the existing CD-RW drive.

Now, the recording method shown in FIGS. 6, 7 will be explained in more detail with reference to the flowchart of FIG. 8.

The flowchart of FIG. 8 is basically identical with FIG. 2 except that the process of steps 801, 802, 803, 804 is added. Numeral 801 designates the step for determining whether the recording pickup has reached the ending point of the zone NO. n currently in recording operation. Unless the ending point of zone No. n is reached, the steps 213, 202, 203, 204, 205 in FIG. 2 are repeated. Once the ending point of zone No. n is reached, on the other hand, the zone No. n-1 located one zone toward the inner periphery is accessed. In step 803, it is determined whether the pickup has reached the ending point of zone No. m at the time of reproduction. Unless the ending point of zone No. m has been reached, the steps 209, 210 of the reproduction process are repeated.

Figure 11:
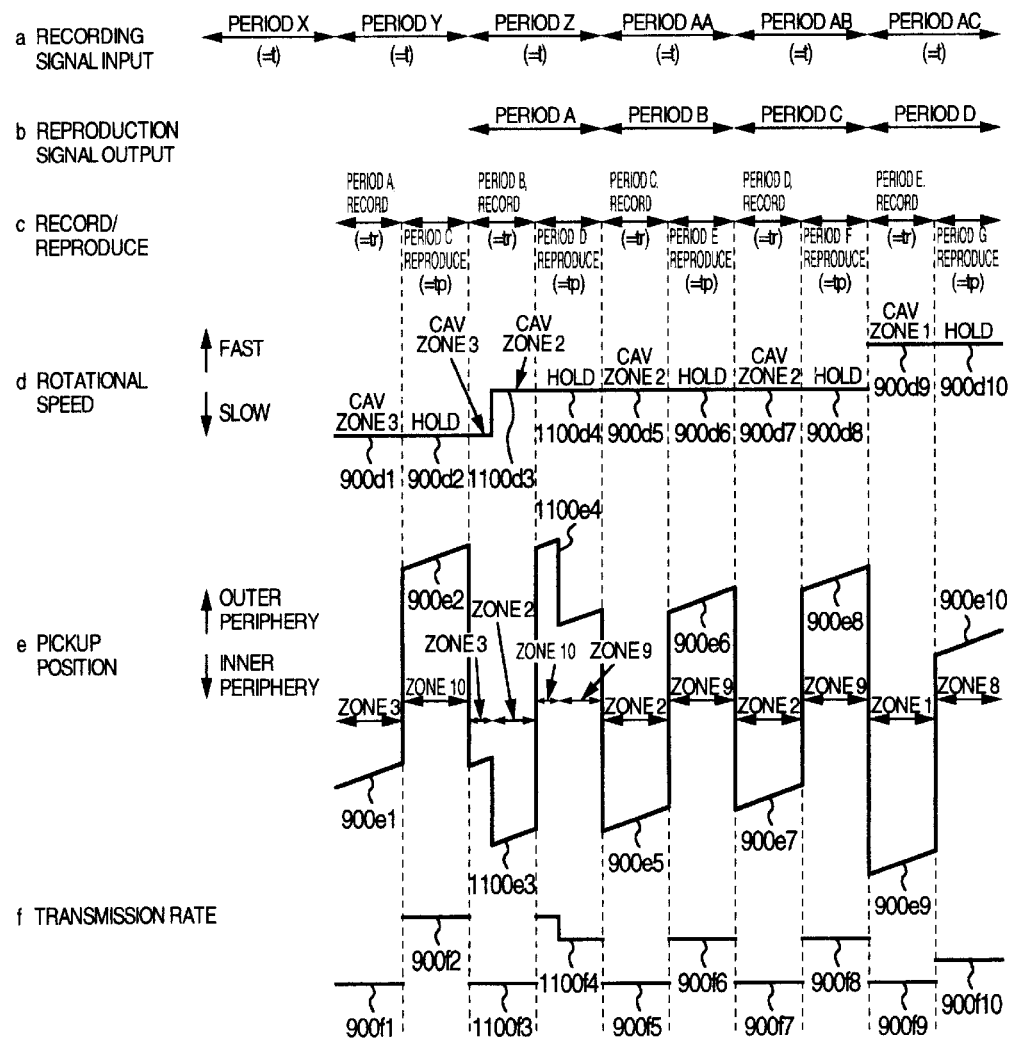
FIG. 11 is a timing chart showing other operations of a recording/reproduction apparatus according to the sixth embodiment of the invention.

Now, a sixth embodiment of the invention will be explained with reference to FIG. 9. FIG. 9 is a time chart applied to a disk according to the embodiment formed with spiral tracks from inner toward outer periphery and normally adapted for recording/reproduction from inner toward outer periphery. The disk is segmented into a plurality of zones from the innermost peripheral zone 1 to the outermost peripheral zone 10 as shown in FIG. 7*a*. The CAV control is effected to assure a predetermined rotational speed within each zone. The rotational speed of each zone is reduced progressively toward the outermost periphery in inverse proportion to the radial direction to assure CLV for each zone in recording. Characters a, d, c, e in this time chart are identical to the corresponding ones in FIG. 6. According to this embodiment, too, therefore, the recording/reproduction is carried out from the inner periphery toward the outer periphery in each zone, and from the outer periphery toward the inner periphery in terms of zones. Also, a constant rotational speed is assured as long as the zone CLV type is employed for recording and the recording process is executed in the same zone, in view of the fact that the rotational speed immediately before switching from recording to reproduction is held for reproduction. The transmission rate f for recording is the same for all of 900*f*1, f3, f5, f7, f9 due to the zone CLV control. On the other hand, a higher transmission rate for reproduction is assured for 900*f*2 at which the rotational speed is held at a value suitable for 900*f*1 on an inner periphery than 900*f*2. Also, since data is recorded at zone CLV, a constant transmission rate is assured during each period of 900*f*2, f4, f6, f8, f10. When the zone changes during the recording period of 900*e*1, e3, e5, e7, e9, though not shown in FIG. 9, the rotational speed changes to a value conforming to the particular zone at the time of zone change. As soon as the zone changes during reproduction in each period of 900*e*2, e4, e6, e8, e10, on the other hand, the reproduction transmission rate changes stepwise. This operation is shown in FIG. 11, which is a time chart similar to the time chart of FIG. 6 except for 1100*d*3, e3, f3 and 1100*d*4, c4, f4. As shown by 1100*e*3, when the zone changes from zone 3 to zone 2 during the recording period, the rotational speed changes in a manner to suit the zone 2. In the process, the data is written at a constant recording transmission rate as shown by 1100*f*3. As shown by 1100*e*4, on the other hand, if a change occurs from zone 10 to zone 9 during the reproduction period, the rotational speed is held as shown by 1100*d*4, so that the transmission rate of the reproduction signal is changed midway of the period as indicated by 1100*f*4. In this way, even in the case where the zone changes during the recording period or the reproduction period, the last rotational speed of the recording period, i.e. the target rotational speed at the head of the recording period is held during the reproduction, and therefore the rotation at the head of the recording period can be stabilized quickly. As seen from above, according to this embodiment, the invention is applicable to a medium of zone CLV type. With a medium using CLV type for recording as shown in the fifth embodiment, if the recording point and the reproduction point are located in the same zone, the transmission rate of the signal reproduced may be substantially the same as but tends to be lower than the transmission rate for recording. In the zone CLV method according to this embodiment, in contrast, the same transmission rate is assured in the same zone, and the transmission rate for reproduction can be always higher than the transmission rate for recording. Also, according to this embodiment, the rotational speed in the zone can be kept constant and therefore can be more easily controlled. Since the transmission rate for reproduction is not under constant change, the processing of the reproduction system is also facilitated.

Figure 10A:
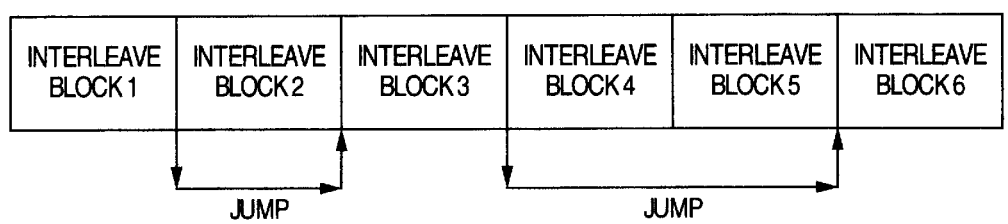
FIGS. 10a and 10b are diagrams showing a structure of a logic format according to a seventh embodiment of the invention.
Figure 10B:
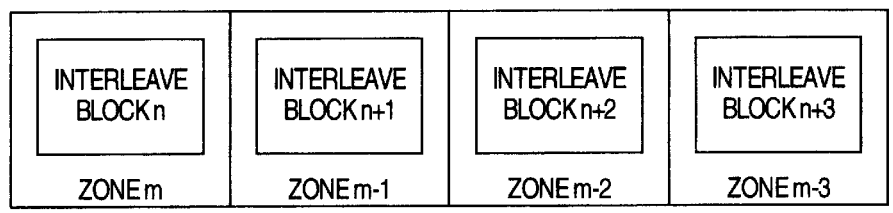

Now, a seventh embodiment of the invention is explained with reference to FIG. 10. FIG. 10*a* shows an example structure of the logic format encoded according to the compression specification such as MPEG for recording a video/audio signal on a disk. FIG. 10*b* is a diagram showing the relation between the logic format and the zones according to the fifth and sixth embodiments. The interleave blocks in FIG. 10*a* are units for jump reproduction in order to realize, without any interruption even for a moment, the processes of (1) selecting one of a plurality of branching stories, and (2) jumping a portion of the story. In other words, the units are for performing the discontinuous or discrete reproduction. In FIG. 10*a*, the interleave blocks 2, 4, 5 are jumped for reproducing the interleave blocks 1, 3, 6 in that order. FIG. 10*b* shows the relation between the interleave blocks and the zones. Each interleave block is recorded in one zone without being divided. Thus, the boundary portion of zones, where the reproduction is discontinuous, always coincide with the portion specified as discontinuous on the logic format.

As described above, according to this embodiment, the zone boundary portions where the reproduction sequence is discontinuous also constitute the discontinuous portions of the logic format in the video reproduction apparatus. The medium used for recording according to this embodiment, therefore, can be used also for reproduction by the existing video reproduction apparatus.

Figure 12:
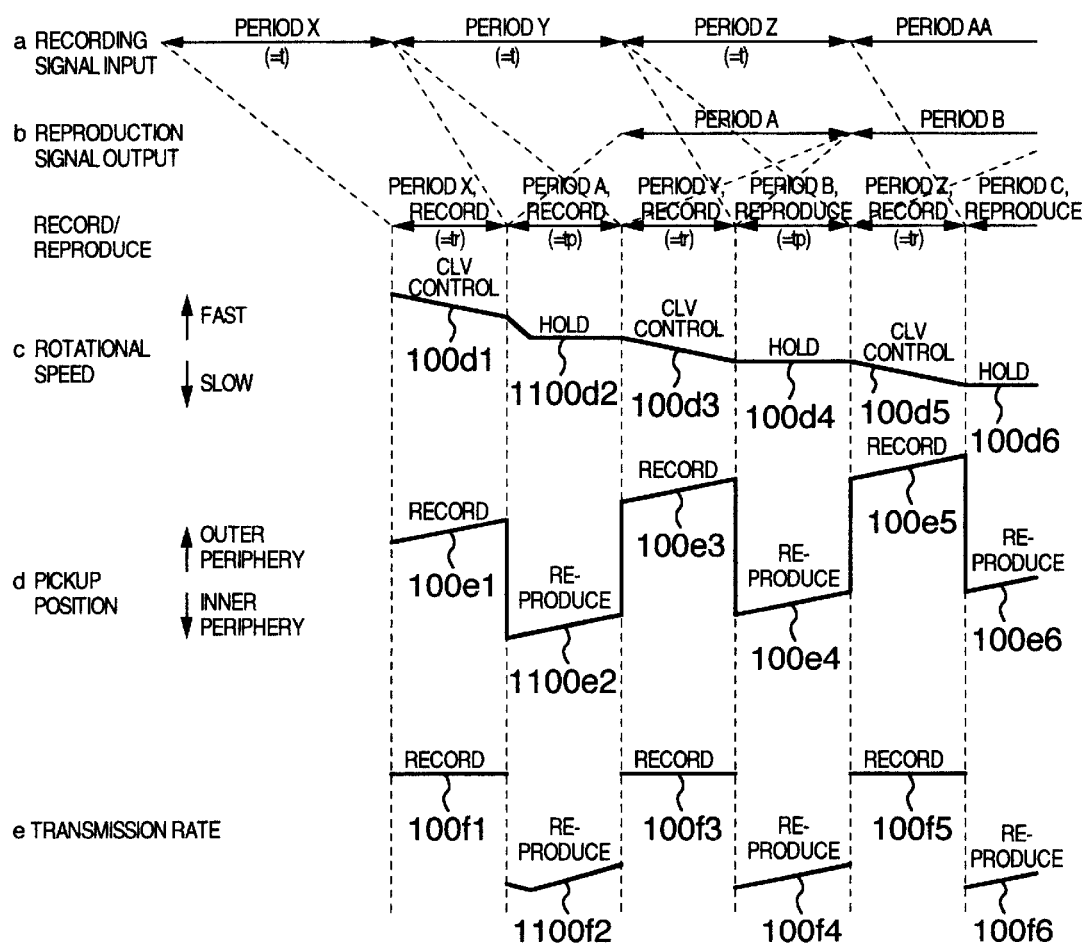
FIG. 12 is a timing chart showing the operation of a recording/reproduction method according to an eighth embodiment of the invention.

Now, an eighth embodiment of the invention is described with reference to FIG. 12. FIG. 12 is a time chart for a recording/reproduction method according to this embodiment. In this embodiment, the data is recorded not in the continuous portions of the medium but discrete portions thereof. The operation is the same as that of the corresponding parts in FIG. 1, except for the portions described below. When the record, erase and overwrite operations are repeated, the recordable portions on the medium may fail to form a continuous area. In such a case, as shown in FIG. 12, the ending point of the recording period 100e1 may fail to coincide with the starting point of the following recording period 100e3.

In such a case, the rotational speed is controlled during the reproduction period 1100e2 between the recording period 100e1 and the recording period 100e3 in such a manner as not to hold the ending point of 100d1 as shown in 1100d2 but to equalize the target rotational speed at the starting point of 100d3. In this control operation, the speed can be corrected gradually over the whole period or using only a portion of the period, as long as the rotation is stable at the target value at the ending point of the period 1100d2. As described above, according to this embodiment, even when the recording operation is jumped, the rotation is so stable at the starting point of the recording period that a stable recording operation is secured. Also, during the reproduction period, the wide capture PLL is used and therefore no reproduction problem is posed even when the reproduction transmission rate undergoes a great change.

In the embodiments described above, the signal being input for a TV program or the like is recorded in the medium while at the same time reproducing the portion already recorded, and therefore the time shift function for a TV program or the like can be realized.

The foregoing description refers to the embodiments in which the data to be recorded and the data to be reproduced are video or audio data. The invention, however, is not limited to such a case but digital data distribution signals such as text information can also be recorded. Further, these data can be combined for recording and/or reproduction.

Although the embodiments described above refer to the case in which the disk rotation during the reproduction period is controlled basically at a constant angular speed, the disk rotation during the reproduction period can be controlled at a constant linear speed as long as normal recording is possible during the recording period and normal reproduction is possible during the reproduction period.

According to this invention, the recording of the input signal and the output of the reproduced signal from the same medium can be carried out at the same time. Also, the rotational speed is controlled according to the recording control system during the recording period, while the rotational speed at the time of switching from recording to reproduction mode is held during the reproduction. When the operation is switched to recording, therefore, a target rotational speed is maintained, thereby making immediate pull-in possible. Thus, a stable rotation control is realized while at the same time attaining a reliable write operation.

What is claimed is:

1. A recording/reproduction apparatus for a digital video signal and/or a digital audio signal, comprising:

a circuit switching a recording operation and a reproducing operation intermittently;

a circuit time-base-compressing the video signal or the audio signal to be recorded;

a circuit recording the time-base-compressed signal in said disk-like recording medium;

a circuit controlling the rotation of said disk-like recording medium in such a manner as to secure a Predetermined rotational speed during a recording period and to hold the same rotational speed in a reproduction period as in the recording period;

a circuit reproducing a signal from said disk-like recording medium;

a circuit time-base-expanding the reproduced signal from the reproducing circuit; and a circuit continuously outputting the time-base-expanded signal as a video signal and/or an audio signal;

wherein said switching circuit switches between a recording period tr (tr: real number) and a reproduction period tp (tp=t−tr) into which a predetermined cycle t (t: real number) is divided, and said rotation control circuit controls the rotation in such a manner as to secure a predetermined rotational speed during the period tr and to hold the last rotational speed of the period tr during the period tp.

2. A recording/reproduction apparatus for a digital video signal and/or a digital audio signal, comprising:

a circuit switching a recording operation and a reproducing operation intermittently;

a circuit time-base-compressing the video signal or the audio signal to be recorded;

a circuit recording the time-base-compressed signal in said disk-like recording medium;

a circuit controlling the rotation of said disk-like recording medium in such a manner as to secure a Predetermined rotational speed during a recording period and to hold the same rotational speed in a reproduction period as in the recording period;

a circuit reproducing a signal from said disk-like recording medium;

a circuit time-base-expanding the reproduced signal from the reproducing circuit; and a circuit continuously outputting the time-base-expanded signal as a video signal and/or an audio signal;

wherein said switching circuit switches between a recording period tr (tr: real number) and a reproduction period tp (tp=t−tr) into which a predetermined cycle t (t: real number) is divided, and the data input during the time t equal in amount to the video or audio data to be recorded is written in a medium by said recording circuit during the time tr.

3. A recording/reproduction apparatus for a digital video signal and/or a digital audio signal, comprising:

a circuit switching a recording operation and a reproducing operation intermittently;

a circuit time-base-compressing the video signal or the audio signal to be recorded;

a circuit recording the time-base-compressed signal in said disk-like recording medium;

a circuit controlling the rotation of said disk-like recording medium in such a manner as to secure a predetermined rotational speed during a recording period and to hold the same rotational speed in a reproduction period as in the recording period;

a circuit reproducing a signal from said disk-like recording medium;

a circuit time-base-expanding the reproduced signal from the reproducing circuit;

a circuit continuously outputting the time-base-expanded signal as a video signal and/or an audio signal; and a circuit switching the operation between record mode, reproduce mode and simultaneous record/reproduce mode;

wherein said switching circuit switches between a recording period tr (tr: real number) and a reproduction period tp (tp=t−tr) into which a predetermined cycle t (t: real number) is divided, and wherein the data is written in said medium during the time tr and prohibited from being written in or read from said medium during the time tp in record mode, the data is read from said medium during the time tp and prohibited from being written in or read from said medium during the time tr in reproduce mode, and the data is written in said medium during the time tr and read from said medium during the time tp in simultaneous record/reproduce mode.

4. A recording/reproduction apparatus for a digital video signal and/or a digital audio signal, comprising:

a circuit switching a recording operation and a reproducing operation intermittently;

a circuit time-base-compressing the video signal or the audio signal to be recorded;

a circuit recording the time-base-compressed signal in said disk-like recording medium;

a circuit controlling the rotation of said disk-like recording medium in such a manner as to secure a predetermined rotational speed during a recording period and to hold the same rotational speed in a reproduction period as in the recording period;

a circuit reproducing a signal from said disk-like recording medium;

a circuit time-base-expanding the reproduced signal from the reproducing circuit; and a circuit continuously outputting the time-base-expanded signal as a video signal and/or an audio signal;

wherein said switching circuit has a switching cycle t (t: real number) composed of a recording time tr (tr: real number) and a reproduction time tp (tp=t−tr), wherein the rotation is controlled by said recording rotation control circuit during the time tr, while the last rotational speed of the time tr is held by the reproduction rotational speed holding operation of said recording rotation control circuit during the time tp, and wherein the recording transmission rate fr (fr: real number) of said recording circuit with respect to said recording medium is constant and satisfies the following equations (total amount of signals input during time $t$) $\leq (fr^*tr)$ (amount of output signal required for video and audio reproduction during time $t$) $\leq (fr^*tp)^*(r_{in}/r_{out})$ where $r_{out}$ is a real number indicating the radius of the outermost periphery of the recording area of the recording medium, and $r_{in}$ is a real number indicating the radius of the innermost periphery of the recording area of the recording medium.

5. A recording/reproduction apparatus for a digital video signal or a digital audio signal, comprising:

a circuit switching a recording operation and a reproducing operation intermittently;

a circuit time-base-compressing the video signal or the audio signal to be recorded;

a circuit recording the time-base-compressed signal in said disk-like recording medium;

a circuit controlling the rotation of said disk-like recording medium in such a manner as to secure a predetermined rotational speed during a recording period and to hold the same rotational speed in a reproduction period as in the recording period;

a circuit reproducing a signal from said disk-like recording medium;

a circuit time-base-expanding the reproduced signal from the reproducing circuit; and a circuit continuously outputting the time-base-expanded signal as a video signal and/or an audio signal;

wherein said time-base-compressing circuit comprises:

a first storage circuit temporarily storing said video signal and/or said audio signal;

a first data write circuit writing said video signal and/or said audio signal in said first storage circuit;

a first data read circuit reading data from said first storage circuit during the recording period; wherein said time-base-expanding circuit comprises:

a second storage circuit temporarily storing said video signal and/or said audio signal;

a second data write circuit writing said reproduced data in the second storage circuit during the reproduction period; and a second data read circuit reading data continuously from said second storage circuit;

wherein said switching circuit switches between a recording period tr (tr: real number) and a reproduction period tp (tp=t−tr) into which a predetermined cycle t (t: real number) is divided, and wherein the recording transmission rate fr (fr: real number) of said recording circuit with respect to said recording medium is constant, and the storage capacity Cap (Cap: real number) of said temporary storage circuit satisfies the following equation, $$Cap \geq (fr^*tr)+(fr^*tp)^*(r_{in}/r_{out})$$

where $r_{out}$ is a real number indicating the radius of the outermost periphery of the recording area of the recording medium, and $r_{in}$ is a real number indicating the radius of the innermost periphery of the recording area of the recording medium.

6. A recording/reproduction method for a digital video signal and/or a digital audio signal, comprising the steps of:

switching a recording mode and a reproduction mode intermittently;

time-base-compressing said video signal and/or said audio signal to be recorded;

recording the time-base-compressed signal in said disk-like recording medium;

controlling the rotation of said disk-like recording medium in such a manner as to maintain a predetermined rotational speed during said recording period and to hold the same rotational speed in said reproduction period as in said recording period;

reproducing the signal from said disk-like recording medium;

expanding the reproduced data on time-base; and outputting said time-base-expanded signal continuously as a video signal and/or an audio signal, as the case may be;

wherein said step of intermittently switching the recording mode and the reproduction mode divides a predetermined cycle t (t: real number) into a recording period tr (tr: real number) and a reproduction period tp (tp=t−tr), and the recording into said recording medium is started from said predetermined cycle t at a predetermined transmission rate, and the time for recording the data equal in amount to the data input during the time t is given as tr.

7. A recording/reproduction method for a digital video signal and/or a digital audio signal according to claim 6, wherein when the recording period tr lengthens due to a defect of said recording medium or an external factor to such an extent that the data reproduced from said disk-like recording medium during the time tp fails to reach the capacity of the video signal and the audio signal continuously output during the time t, the reproduced image for the preceding frame is held for the video signal to compensate for the drop-off of the reproduction data, and the reproduced voice is processed by muting for the audio signal.

8. A recording/reproduction method for a digital video signal and/or a digital audio signal according to claim 6, wherein the recording transmission rate fr (fr: real number) for said recording medium in said recording process is determined to satisfy the following equation, amount of output signal required for video and audio reproduction during time $t) \leq (fr*tp)*(r_{in}/r_{out})$ where $r_{out}$ is a real number indicating the radius of the outermost periphery of the recording area of the recording medium, and $r_{in}$ is a real number indicating the radius of the innermost periphery of the recording area of the recording medium.

9. An optical disk apparatus capable of recording information optically in an optical disk, comprising recording/reproduction circuit for recording and/or reproducing digital data, a drive circuit driving said optical disk rotationally, a rotation control circuit controlling said drive circuit in such a manner as to obtain a predetermined rotational speed, and a recording/reproduction control circuit controlling the recording/reproduction processing of said recording/reproduction circuit, wherein said recording/reproduction circuit includes a time-base-compression circuit time-base-compressing the digital data to be recorded in said optical disk, a time-base-expansion circuit time-base-expanding the digital data reproduced from said optical disk, and a memory circuit time-base-holding the digital data to be recorded or the digital data to be reproduced, and wherein said recording/reproduction control circuit controls said recording/reproduction circuit in such a manner that a recording period tr during which said digital data can be recorded in said optical disk and a reproduction period tp during which said digital data can be reproduced from said optical disk are repeated at intervals of a predetermined time t (=tr+tp).

10. An optical disk apparatus according to claim 9, wherein said rotation control circuit controls the drive circuit in such a manner that the linear speed at the recording points in said recording period is constant during the recording period, and wherein said rotation control circuit controls the drive circuit in such a manner that the angular speed is constant during said reproduction period, and said constant angular speed is the same as the angular speed at the end of the immediately preceding recording period or the same as the angular speed at the time of start of the immediately following recording period.

11. An optical disk apparatus according to claim 9, wherein the digital data in the same amount as the digital data input during said predetermined time t is recorded during said recording time tr, and the digital data in the same amount as the digital data to be output during said predetermined time t is reproduced during the reproduction period tp.

12. An optical disk apparatus according to claim 9, further comprising a mode setting circuit setting the mode of operation to be executed, wherein when the mode set by said mode setting circuit is the recording mode exclusively designating the recording operation, the reproduction processing is suspended during said reproduction period tp, and when the mode set by said mode setting circuit is the reproduction mode exclusively designating the reproduction operation, the recording processing is suspended during said recording period tr.

* * * * *